US010013175B2

(12) United States Patent
Lu et al.

(10) Patent No.: US 10,013,175 B2
(45) Date of Patent: Jul. 3, 2018

(54) METHOD AND DEVICE FOR INDEXING EXTERNAL SD CARD

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

(*) Notice: Subject to any disclaimer, the term of this patent is extended or adjusted under 35 U.S.C. 154(b) by 264 days.

(21) Appl. No.: 15/027,446

(22) PCT Filed: Oct. 16, 2014

(86) PCT No.: PCT/CN2014/088728
§ 371 (c)(1),
(2) Date: Apr. 6, 2016

(87) PCT Pub. No.: WO2015/096541
PCT Pub. Date: Jul. 2, 2015

(65) Prior Publication Data
US 2016/0342331 A1 Nov. 24, 2016

(30) Foreign Application Priority Data

Dec. 27, 2013 (CN) .......................... 2013 1 0741343

(51) Int. Cl.
G06F 3/06 (2006.01)
G06F 17/30 (2006.01)

(52) U.S. Cl.
CPC ............ *G06F 3/061* (2013.01); *G06F 3/0604* (2013.01); *G06F 3/0635* (2013.01); *G06F 3/0683* (2013.01); *G06F 17/30091* (2013.01)

(58) Field of Classification Search
CPC . G06F 13/385; G06F 13/4022; G06F 13/4282
See application file for complete search history.

(56) References Cited

U.S. PATENT DOCUMENTS

2010/0262904 A1 10/2010 Chou et al.

Primary Examiner — Tim T Vo
Assistant Examiner — Herve Iradukunda
(74) Attorney, Agent, or Firm — Hammer & Associates, P.C.

(57) ABSTRACT

A method for indexing an external SD card. The method comprises: acquiring a mount path list; determining whether or not a filter criterion is satisfied by each mount path in the mount path list, if the criterion is satisfied, then splitting with spaces a current mount path into multiple paths, determining whether or not each path contains a preset string, and if yes, then recording the current path as a suspected external SD card path; and, determining whether or not a final external SD card path is in the suspected external SD card path recorded, if yes, then a final external SD card is found, and if not, then no final external SD card is found. By analyzing a file system table and a mount command, the present invention implements acquisition of a mount path of an external SD card on Android platforms of different versions and different customizations, thus allowing the implementation in an Android operating system of external SD card indexing without having to rely on an API function for implementation, and improving compatibility.

5 Claims, 6 Drawing Sheets

METHOD AND DEVICE FOR INDEXING EXTERNAL SD CARD

FIELD OF THE INVENTION

The present invention relates to a method for retrieving/indexing an external SD card and a device thereof in the field of computer technology.

PRIOR ART

Android platform is an operation system based on a mobile device, which is developed and maintained by Google Inc., and the platform supports Java and C/C++. Because of limited storage space and high cost of a hardware component of a mobile device, a large number of application data is inputted or outputted only via a SD card. At the moment, many mobile phones are integrated with SD cards, and some of the mobile phones support detachable SD card, which are with both of a built-in SD card and an external SD card. When a mobile phone supports both the built-in SD card and the external SD card, Android system API is invoked to obtain a SD card path and the SD card path is a built-in SD card path. Android system is fragmentation, and paths of processing SD cards from different mobile phone manufacturers are different, therefore, it becomes more difficult to obtain a needed SD card. So, it is an important issue that how to find an external SD card which is operated at Android platform.

SUMMARY OF THE PRESENT INVENTION

The object of the present invention is to provide a method for retrieving an external SD card and a device thereof, in which a mount path of the external SD card could be obtained from Android platforms of different editions. In this way, it does not need to rely on API function any more to realize that an external SD card is retrieved under Android operation system, and the device has a better compatibility.

According to one aspect of the present invention, there is provided a method for retrieving an external SD card, including:

Step S1, obtaining a loading paths list;

Step S2, making the first loading path in the loading paths list as a current information record;

Step S3, determining whether the current information record meets a filter criterion, if yes, executing Step S4; otherwise, executing Step S9;

Step S4, detaching the current information record into a plurality of paths by with a space, and making the first path as a current path of the current information record;

Step S5, determining whether any preset character string is included into the current path, if yes, executing Step S6; otherwise, executing Step S7;

Step S6, recording the current path and making it as a suspected external SD card path, executing Step S7;

Step S7, determining whether any unprocessed path exists in the current information record, if yes, executing Step S8; otherwise, executing Step S9;

Step S8, making a next path as the current path of the current information record, returning to Step S5;

Step S9, determining whether any unprocessed loading path exists in the loading paths list, if yes, executing Step S10; otherwise, executing Step S11;

Step S10, making a next loading path in the loading paths list as the current information record, returning to Step S3;

Step S11, determining whether any suspected external SD card is recorded, if yes, executing Step S12; otherwise, a final external SD card is not found; and Step S12, determining whether the final external SD card path exists in the recorded suspected external SD card paths, if yes, the final external SD card is found; otherwise, the final external SD card is not found.

Preferably, Step S1 specifically including: obtaining all of loading paths from a file system list via a mount command, obtaining all loading paths in a Linux file system list, and obtaining the loading paths list in accordance with all of the obtained loading paths.

Preferably, Step S3 specifically including: determining whether a first preset character string and a second preset character string exist in the current information record, if yes, the current information record meets the filter criterion; otherwise, the current information record does not meet the filter criterion; and Step S5 specifically including: determining whether the first preset character string is included in the current path, if yes, executing Step S6; otherwise, executing Step S7.

Preferably, Step S12 specifically including:

Step S12-1, making the first suspected external SD card path recorded as a current suspected external SD card path;

Step S12-2, determining whether the current suspected external SD card path is the final external SD card path, if yes, finding the final external SD card; otherwise, executing Step S12-3; and Step S12-3, determining whether all suspected external SD card paths are processed, if yes, the final external SD card is not found; otherwise, making the next suspected external SD card path recorded as the current suspected external SD card path, and returning to Step S12-2.

Preferably, Step S1 specifically including: getting the loading paths list by obtaining all loading paths from the file system list via the mount command;

When the final external SD card is not found in Step 12, the method further including:

Step S13, obtaining all loading paths in the Linux file system list;

Step S14, making the first obtained loading path as the current information record;

Step S15, determining whether the current information record meets the filter criterion/filtering requirement/requirement for filtering, if yes, executing Step S16; otherwise, executing Step S21;

Step S16, detaching the current information record into a plurality of paths with the space, making the first paths as the current paths of the current information record;

Step S17, determining whether the preset character string is included in the current path, if yes, executing Step S18; otherwise, executing Step S19;

Step S18, recording the current path and making the path as the suspected external SD card path, executing Step S19;

Step S19, determining whether any unprocessed path exists in the current information record, if yes, executing Step S20; otherwise, executing Step S21;

Step S20, making a next path as the current path of the current information record, returning to Step S17;

Step S21, determining whether any unprocessed loading path which is obtained exists, if yes, executing Step S22; otherwise, executing Step S21;

Step S22, making a next loading path obtained as the current information record, returning to Step S15;

Step S23, determining whether any suspected external SD card path is recorded, if yes, executing Step S24; otherwise, the final external SD card is not found; and Step S24, determining whether the final external SD card path is included in the recorded suspected external SD card paths, if yes, the final external SD card is found; otherwise, the final external SD card is not found.

According to the other aspect of the present invention, there is provided a device for retrieving an external SD card, the device including:

an obtaining module which is configured to obtain a loading paths list;

a first pointing module which is configured to make the first loading path in the loading paths list as a current information record; and the first pointing module is further configured to make a next loading path in the loading paths list as the current information record;

a first determining module which is configured to determine whether the current information record meets a filter criterion, if yes, a detaching module works; otherwise works, a fourth determining module works;

the detaching module which is configured to detach the current information record into a plurality of paths by with a space;

a second pointing module which is configured to make the first path as a current path of the current information record and make a next path as the current path of the current information record;

a second determining module which is configured to determine whether any preset character string is included in the current path, if yes, a recording module works; otherwise, a third determining module works;

the recording module which is configured to record the current path and make it as a suspected external SD card path;

the third determining module which is configured to determine whether any unprocessed path exists in the current information record, if yes, the second pointing module works; otherwise, a fourth determining module works;

the fourth determining module which is configured to determine whether any unprocessed loading path exists in the loading paths list, if yes, the first pointing module works; otherwise, a fifth determining module works;

the fifth determining module which is configured to determine whether any suspected external SD card path is recorded, if yes, a sixth determining module works; otherwise, the final external SD card is not found; and the sixth determining module which is configured to determine whether the final external SD card path is included in the recorded suspected external SD card paths, if yes, the final external SD card is found; otherwise, the final external SD card is not found.

Preferably, the obtaining module comprising:

a first obtaining unit which is configured to obtain all loading paths from a system file via a mount command;

a second obtaining unit which is configured to obtain all loading paths in a Linux file system list; and a generating unit which is configured to obtain the loading paths list according to all loading paths obtained by the first obtaining unit and all loading paths obtained by the second obtaining unit.

Preferably, the first determining module is specifically configured to determine whether the first preset character string and the second preset character string are included in the current information record, if yes, the detaching module works; otherwise, the fourth determining module works; and the second determining module is configured to determine whether the first preset character string is included in the current path, if yes, the recording module works; otherwise, the third determining module works.

Preferably, the sixth determining module comprising:

a first pointing unit which is configured to make the first recorded suspected external SD card path as the current suspected external SD card path; and the first pointing unit is further configured to make the next suspected external SD card as the current suspected external SD card path;

a first determining unit which is configured to determine whether the current suspected external SD card path is the final external SD card path, if yes, the final external SD card is found; otherwise, a second determining unit works; and the second determining unit which is configured to determine whether all of the suspected external SD card paths are processed, if yes, the final external SD card is not found; otherwise, the first pointing unit works.

Compared to the prior art, the present invention has following advantages: in the technical solution of the present invention, all loading paths are obtained from a file system list (vold.fstab) via a mount command of Linux, subsequently, whether any loading path of external SD card exists in the loading paths is determined, or the loading path of the external SD card is obtained by analyzing a Linux file system list. By analyzing the file system list and the mount command and using conventional channel technology of Linux, a mount path of the external SD card is obtained at Android platforms of different editions, so that the external SD card could be retrieved under an Android operation system instead of relying on API function, in this way, the device has a better compatibility.

BRIEF DESCRIPTION OF ACCOMPANYING DRAWINGS

DETAILED DESCRIPTION OF THE PRESENT INVENTION

The technical solution in the Embodiments of the present invention is further described more clearly and completely with the drawings in the Embodiments of the present invention. Apparently, Embodiments described are just a few of all Embodiments of the present invention. On the basis of Embodiments of the invention, all other related Embodiments made by those skilled in the art without inventive work belong to the scope of the invention.

The Android operation system includes two parts, communication between bottom layer and hardware is implemented via an Android cropped version of a standard Linux kernel which is developed by Linux foundation, the Android cropped version could not only run dalvik program so that the hardware is conveniently managed by the dalvik program via a Linux kernel, but also reflect the hardware drive of the third party manufacturer with commercial copyright which relates to some unopened source codes to the Linux kernel to be managed. The interactive functions between an Android operation system and an actual operation of user are implemented by Java language based on dalvik virtual machine and/or C/C++ shared library.

Embodiment 1

Figure 1:
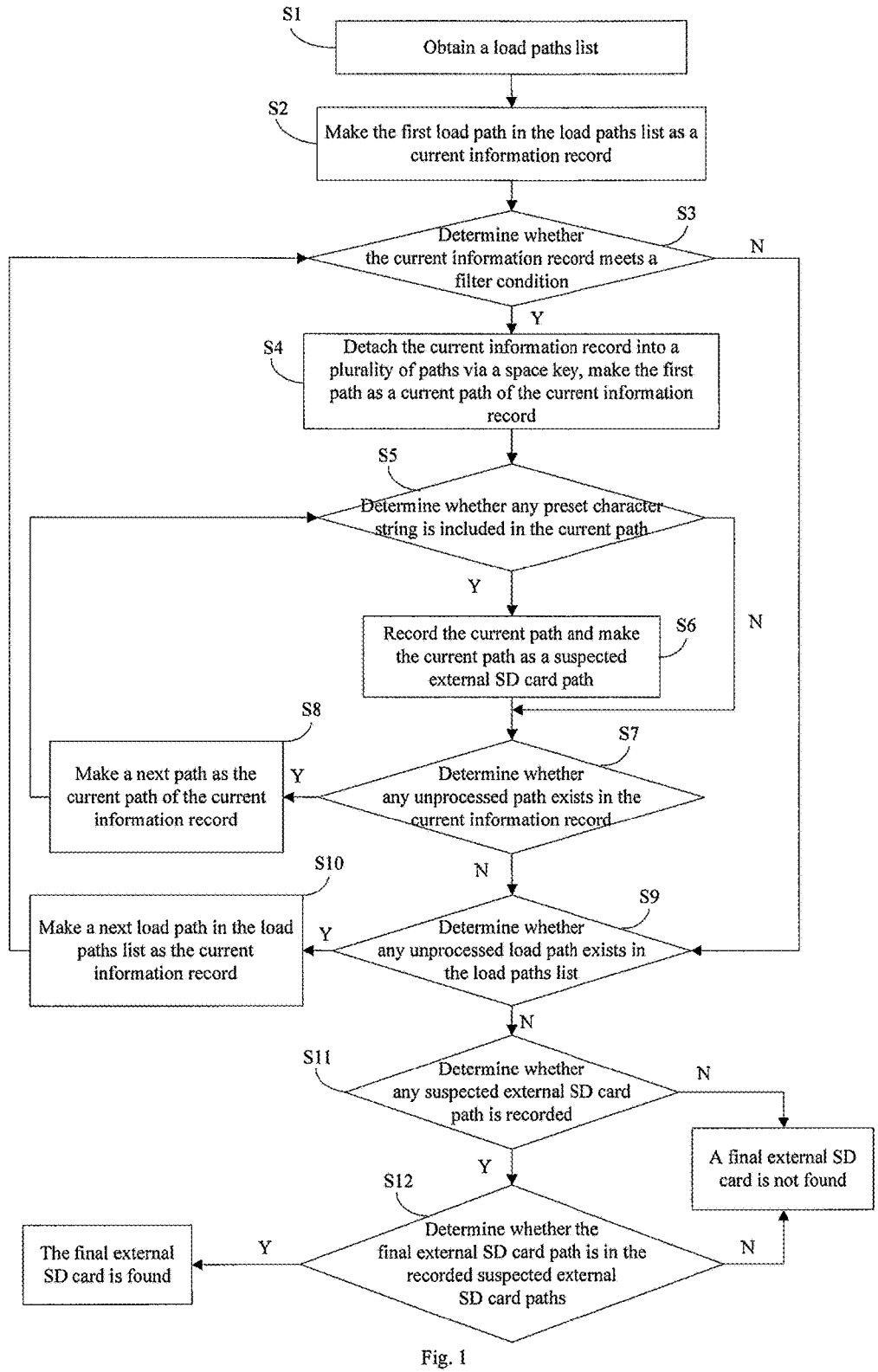
FIG. 1 shows a flow diagram illustrating a method for retrieving an external SD card according to Embodiment 1 of the present invention.

Embodiment 1 of the present invention provides a method for retrieving an external SD card, as shown in FIG. 1, the method includes:

Step S1, a loading paths list is obtained;

In Embodiment 1, all loading paths are obtained from a file system list via a mount command, all of loading paths in a Linux file system list are obtained; according to all of the loading paths, the loading paths list is obtained;

Step S2, the first loading path in the loading paths list is made as a current information record;

Step S3, whether the current information record meets a filter criterion is determined, if yes, Step S4 is executed; otherwise, Step S9 is executed;

Specifically, the filter criterion in Embodiment 1 includes: a first preset character string and a second preset character string are included in an information record, preferably, the first preset character string is mnt or storage, and the second preset character string is vfat;

Step S4, the current information record is detached into a plurality of paths via a space, the first path is made as a current path of the current information record;

Step S5, whether any preset character string is included in the current path is determined, if yes, Step S6 is executed; otherwise, Step S7 is executed;

Specifically, the preset character string in the present Embodiment is the first preset character string which is preferably mnt or storage;

Step S6, the current path is recorded and made as a suspected external SD card path, Step S7 is executed;

Step S7, whether any unprocessed path exists in the current information record is determined, if yes, Step S8 is executed; otherwise, Step S9 is executed;

Step S8, the next path is made as the current path of the current information record, Step S5 is returned to;

Step S9, whether any unprocessed loading path exists in the loading paths list is determined, if yes, Step S10 is executed; otherwise, Step S11 is executed;

Step S10, the next loading path in the loading paths list is made as the current information record, Step S3 is returned to;

Step S11, whether any suspected external SD card path is recorded is determined, if yes, Step S12 is executed; otherwise, a final external SD card is not found;

Step S12, whether the final external SD card path is included in the recorded suspected external SD card path is determined, if yes, the final external SD card is found; otherwise, the final external SD card is not found.

Specifically, in Embodiment 1, Step S12 includes: by taking the recorded suspected external SD card paths as parameters, an interface function is invoked, a result returned by the interface function is determined, the final external SD card is found in the case that the result is a first preset value, the current suspected external SD card path is determined to be the final external SD card path; and the final external SD card is not found in the case that the result is a second preset value;

Specifically, in Embodiment 1, the interface functions are invoked successively in the case that there are a plurality of suspected external SD card paths; one path of the above suspected external SD card paths is made as the parameter, a SD card corresponding to the suspected external SD card path is tried to be communicated with and a corresponding result is returned, the SD card is communicated with successfully in the case that the returned result is the first preset value; the SD card is communicated with unsuccessfully in the case that the returned result is the second preset value; preferably, the first preset value is True, and the second preset value is False; that the SD card corresponding to the suspected external SD card path tries to be communicated with specifically includes: an initializing command is sent to a device corresponding to the suspected external SD card path, and whether a response returned by the device is received is determined, if yes, the SD card is communicated with successfully; otherwise, the SD card is communicated with unsuccessfully;

In the present Embodiment 1, when it is obtained, a suspected external SD card path is made as the parameter to invoke the interface function to try to communicate with the corresponding device, i.e., Step S11 is deleted, after Step S6, Step S12 is executed; when the final external SD card is not found in Step S12, Step S7 is executed; the final external SD card is not found in the case that there is no unprocessed loading path in the loading paths list.

In Embodiment 1, in the case that the final external SD card is found, an identifier corresponding to the SD card may be set, or a corresponding handle is saved.

Embodiment 2

Figure 2:
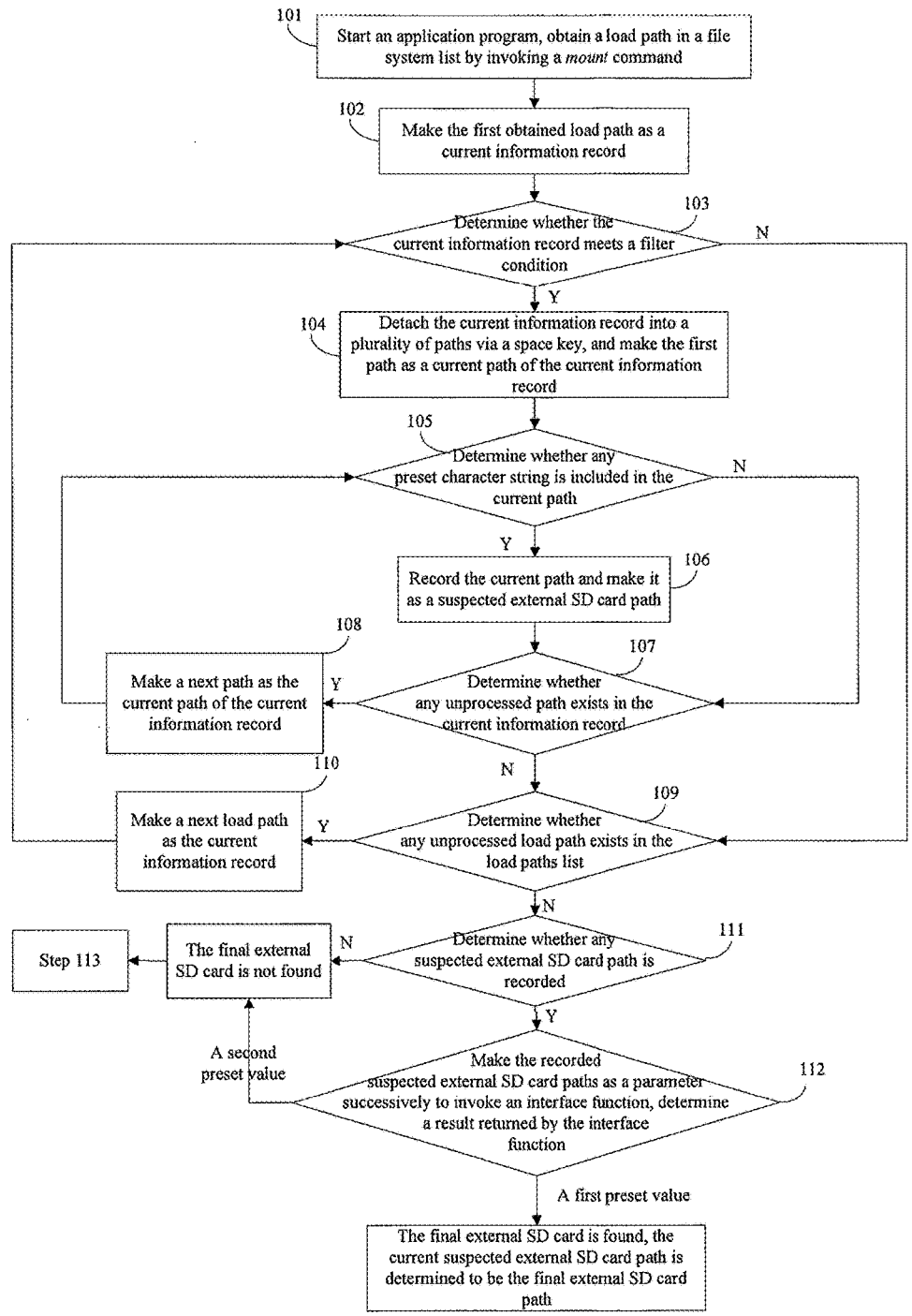
FIGS. 2-3 show a flow diagram illustrating a method for retrieving an external SD card according to Embodiment 2 of the present invention.
Figure 3:
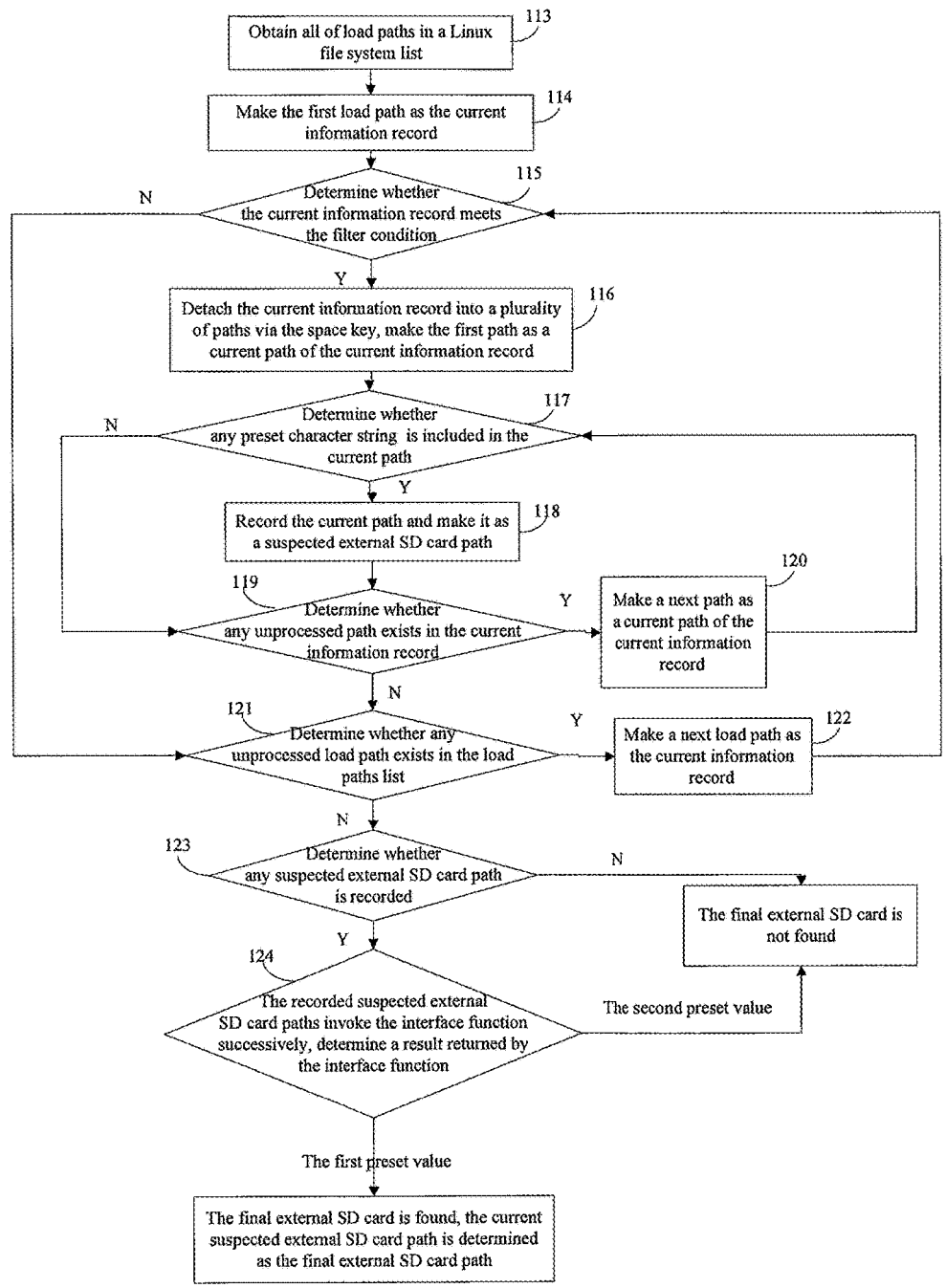

There is provided a method for retrieving an external SD card in Embodiment 2 of the present invention, in which, at first, a mount command is started via a popen function, the popen( ) function invokes fork to spawn a child process by creating a channel, and executes a shell to launch a command to start an application program; as shown in FIGS. 2-3, the method includes:

Step 101, the application program is started, and a loading path is obtained from a file system list by invoking a mount command;

For instance, the obtained loading path in Embodiment 2 is:

/dev/sda1 on/type ext3 (rw,errors=remount-ro)
proc on/proc type proc (rw,noexec,nosuid,nodev)
sysfs on/sys type sysfs (rw,noexec,nosuid,nodev)
none on/sys/fs/fuse/connections type fusect1 (rw)
none on/sys/kernel/debug type debugfs (rw)
none on/sys/kernel/security type securityfs (rw)
tmpfs/mnt/asec tmpfs rw,relatime/mnt/messtorage tmpfs rw,nodev
/dev/fuse/storage/sdcard0 fuse(rw,nosuid,nodev,usr id=1023)devpts on/dev/pts type devpts (rw,noexec,nosuid,gid=5,mode=0620)
tmpfs on/run type tmpfs (rw,noexec,nosuid,size=10%,mode=0755)
none on/run/lock type tmpfs (rw,noexec,nosuid,nodev,size=5242880)
none on/run/shm type tmpfs (rw,nosuid,nodev)
/dev/block/vold/179.9/storage/sdcard1 vfat rw,dirsync,nosuid,nodev;

Step 102, the first obtained loading path is made as a current information record;

Step 103, whether the current information record meets a filter criterion is determined, if yes, Step 104 is executed; otherwise, Step 109 is executed;

Specifically, the filter criterion in Embodiment 2 includes: the first preset character string and the second preset character string are included in an information record, preferably, the first preset character string is mnt or storage, the second preset character string is vfat;

Step 109 is executed in the case that the current information record is /dev/sda1 on/type ext3 (rw, errors=remount-ro) which does not include mnt & vfat or which includes storage & vfat;

Step 104 is executed in the case that the current information record is /dev/block/vold/179.9/storage/sdcard1 vfat rw, dirsync, nosuid, nodev, which includes storage and vfat;

Step 104, the current information record is detached into a plurality of paths via a space, the first path is made as a current path of the current information record;

For instance, in Embodiment 2, /dev/block/vold/179.9 /storage/sdcard1 vfat rw, dirsync, nosuid, nodev is detached into three paths of /dev/block/volda 79.9,/storage/sdcard1, and vfat rw, dirsync, nosuid, nodev;

Step 105, whether any preset character string is included in the current path is determined, if yes, Step 106 is executed; otherwise, Step 107 is executed;

Specifically, the preset character string in Embodiment 2 is the first preset character string which is preferably mnt or storage;

For instance, in Embodiment 2, mnt or storage is not included in the path of /dev/block/volda 79.9 and the path of vfat rw, dirsync, nosuid, nodev, Step 107 is executed; storage is included in the path of /storage/sdcard1, Step 106 is executed;

Step 106, the current path is recorded and made as a suspected external SD card path, Step 107 is executed; specifically, in the present embodiment, /storage/sdcard1 is made as the suspected external SD card path;

Step 107, whether any unprocessed path exists in the current information record is determined, if yes, Step 108 is executed; otherwise, Step 109 is executed;

Step 108, a next path is made as the current path of the current information record, Step 105 is returned to;

Step 109, whether any unprocessed loading path exists in the loading paths list is determined, if yes, Step 110 is executed; otherwise, Step 111 is executed;

Step 110, the next loading path is made as the current information record, Step 103 is returned to;

Step 111, whether any suspected external SD card path is recorded is determined, if yes, Step 112 is executed; otherwise, a final external SD card is not found, Step 113 is executed;

Step 112, the recorded suspected external SD card paths are made as parameters successively to invoke an interface function, a result returned by the interface function is determined, the final external SD card is found in the case that the result is the first preset value, the current suspected external SD card path is determined as the final external SD card path; the final external SD card is not found in the case that the result is the second preset value, Step 113 is executed;

Step 113, all loading paths in a Linux file system list are obtained;

Step 114, the first loading path is made as the current information record;

Step 115, whether the current information record meets a filter criterion is determined, if yes, Step 116 is executed; otherwise, Step 121 is executed;

The filter criterion in Step 115 of Embodiment 2 is identical to the filter criterion in Step 103; unnecessary details will not be given herein;

Step 116, the current information record is detached into a plurality of paths via a space, the first path is made as a current path of the current information record;

Step 117, whether the current path includes any preset character string is determined, if yes, Step 118 is executed; otherwise, Step 119 is executed;

The filter criterion in the step in Embodiment 2 is identical to the filter criterion in Step 105, it is unnecessary to give more details herein;

Step 118, the current path is recorded and made as a suspected external SD card path, Step 119 is executed;

Step 119, whether any unprocessed path exists in the current information record is determined, if yes, Step 120 is executed; otherwise, Step 121 is executed;

Step 120, a next path is made as the current path of the current information record, Step 117 is returned to;

Step 121, whether any unprocessed path exists in the loading paths list is determined, if yes, Step 122 is executed; otherwise, Step 123 is executed;

Step 122, a next loading path is made as the current information record, Step 115 is returned;

Step 123, whether any suspected external SD card path is recorded is determined, if yes, Step 124 is executed; otherwise, the final external SD card is not found;

Step 124, the interface function is invoked by the recorded suspected external SD card paths successively, a result returned by the interface function is determined, if the result is the first preset value, the final external SD card is found, the current suspected external SD card path is determined as the final external SD card path; if the result is the second preset value, the final external SD card is not found;

Specifically, in Embodiment 2, if there are a plurality of external SD card paths, one of the suspected external SD card paths is made as the parameter to invoke the interface function, the SD card corresponding to the suspected external SD card path is tried to be communicated with and a corresponding result is returned, the SD card corresponding to the suspected external SD card path is communicated with successfully in the case that the returned result is the first preset value, the current suspected external SD card path is determined as the final external SD card path; the SD card corresponding to the suspected external SD card path is communicated with unsuccessfully in the case that the returned result is the second preset value; preferably, the first preset value is True, the second preset value is False.

Figure 4:
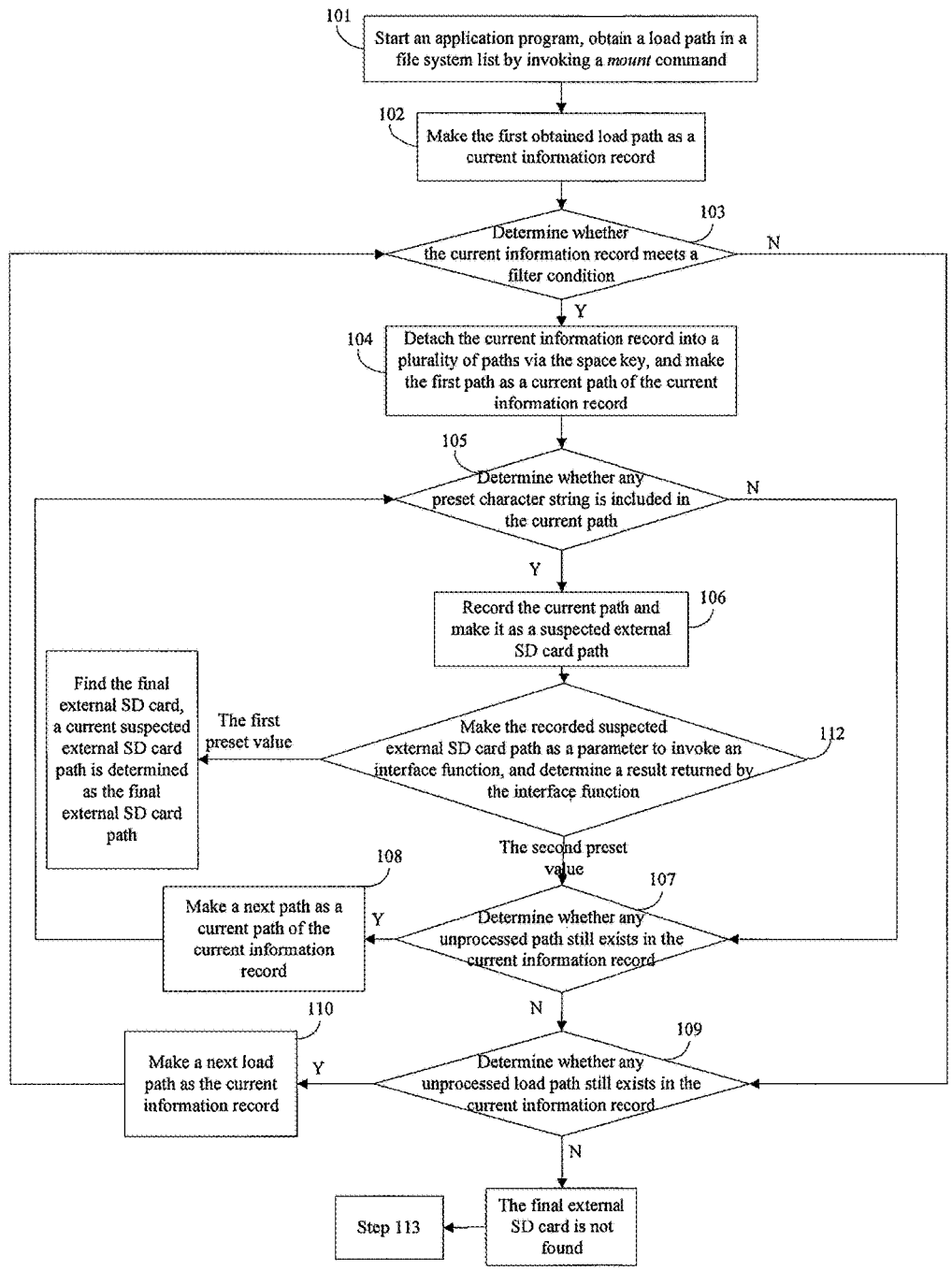
FIGS. 4-5 show a flow diagram illustrating another implementation way of the method for retrieving an external SD card according to Embodiment 2 of the present invention.
Figure 5:
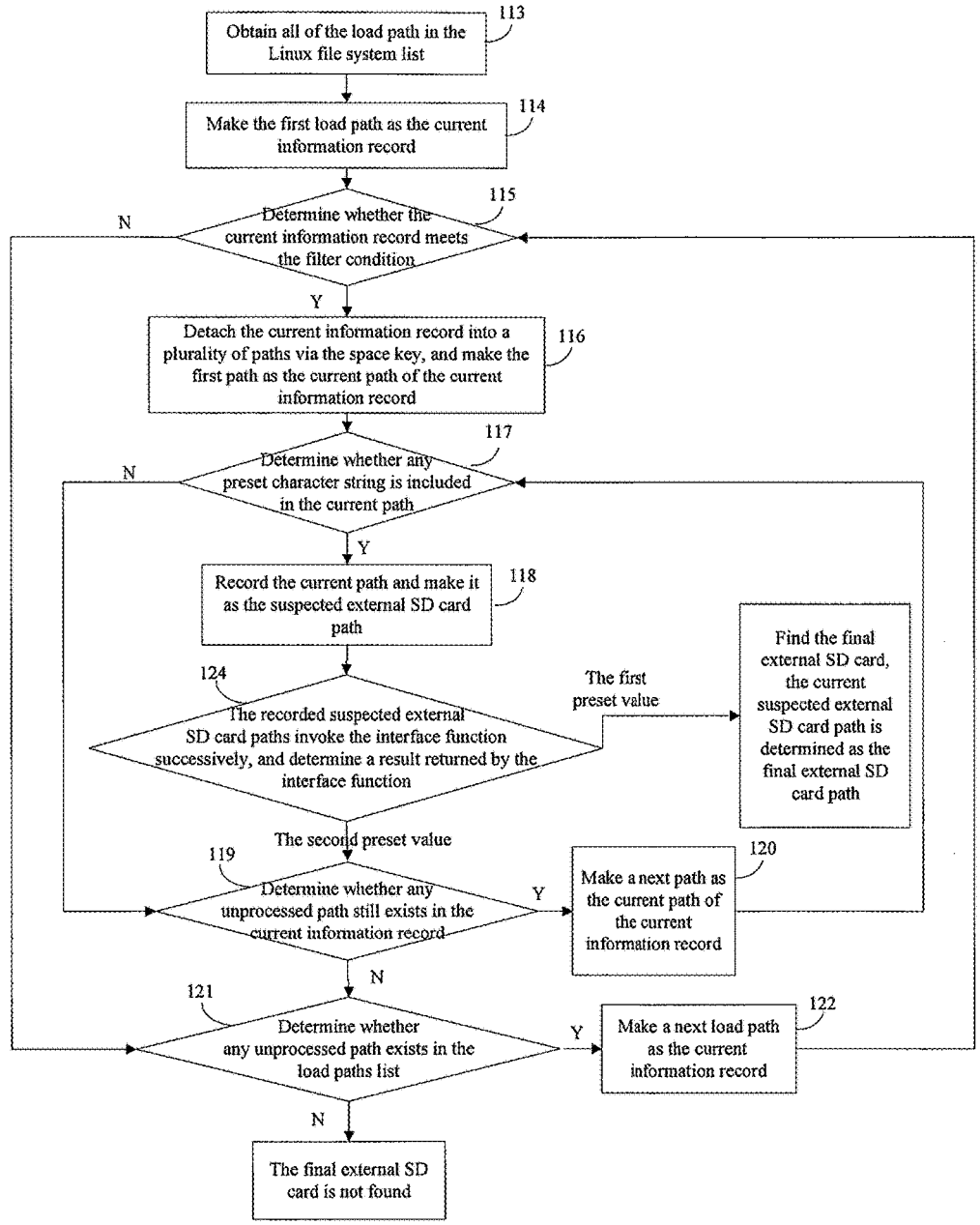

In Embodiment 2, each suspected external SD card path is made as the parameter successively to invoke the interface function to try to communicate with a corresponding device after all the suspected external SD card paths are obtained, the final SD card path is found in the case that the suspected external SD card is communicated with the corresponding device successfully; the process may be that one suspected external SD card path is made as the parameter to invoke the interface function to try to communicate with the corresponding device after the suspected external SD card path is obtained, that is, Step 111 and Step 123 are deleted, Step 112 is executed after Step 106, Step 107 is executed if the result is determined as the second preset value in Step 112, and Step 113 is executed if there exists no unprocessed loading path in the loading paths list in Step 109; Step 124 is executed after Step 118, Step 119 is executed if the returned result is the second preset value in Step 124, and the final external SD card is not found in the case that there exists no unprocessed loading path in the loading paths list in Step 121, the implementation as shown in FIGS. 4-5.

In Embodiment 2, all the loading paths are obtained from the Linux file system list in the case that there is no suspected external SD card path in all of the loading path which are obtained via a mount command, whether any suspected external SD card path exists in the loading paths which are obtained from the Linux file system list is determined, the device corresponding to the path is tried to be communicated with if a suspected external SD card path is found, the SD card in the device corresponding to the path is the external SD card needed to be found if the device is communicated with successfully. By the method in Embodiment 2, the implementation of retrieving an external SD card under Android operation system will not rely on API function any more, and the device has a better compatibility.

Embodiment 3

Figure 6:
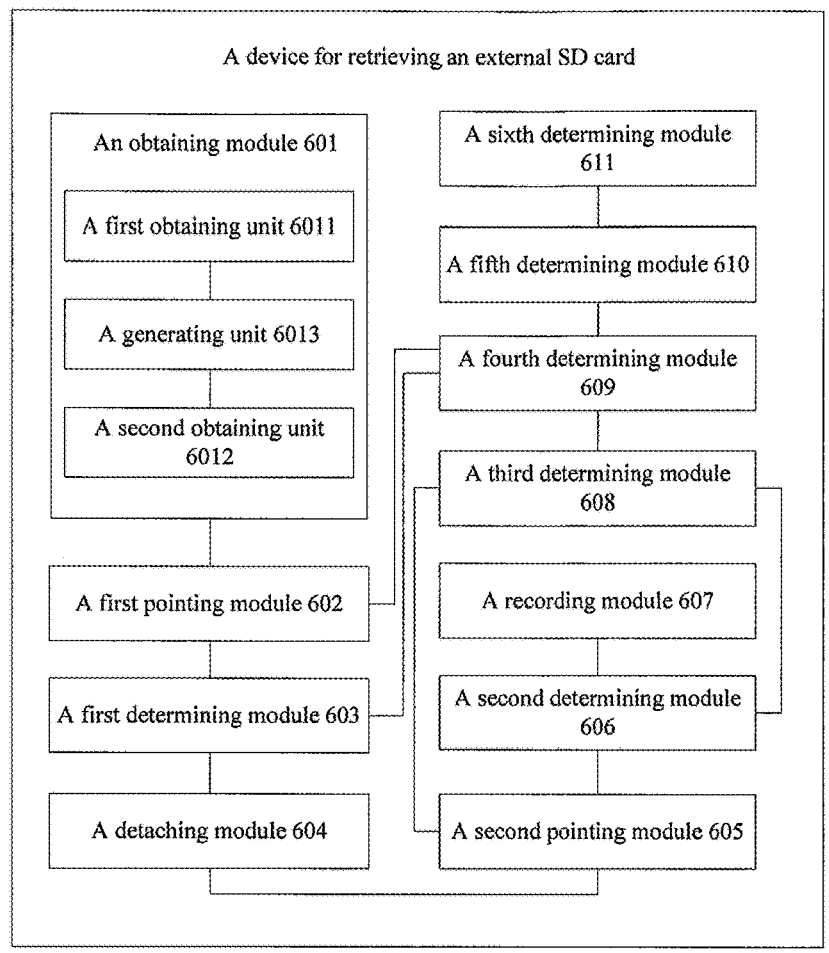
FIG. 6 shows a block diagram illustrating a device for retrieving an external SD card according to Embodiment 3 of the present invention.

There is provided a device for retrieving an external SD card in Embodiment 3 of the present invention. As shown in FIG. 6, the device includes:

an obtaining module 601 which is configured to obtain a loading paths list;

specifically, the obtaining module 601 in the present embodiment includes:

a first obtaining unit 6011 which is configured to obtain all of loading paths from system files via a mount command;

a second obtaining unit 6012 which is configured to obtain all of loading paths in a Linux file system list; and a generating unit 6013 which is configured to obtain a loading paths list according to all of the loading paths obtained by the first obtaining unit 6011 and all of the loading paths obtained by the second obtaining unit 6012;

a first pointing module 602 which is configured to make the first loading path in the loading paths list as a current information record, and the first pointing module 602 is also configured to make a next loading path in the loading paths list as the current information record;

a first determining module 603 which is configured to determine whether the current information record meets a filter criterion, if yes, a detaching module 604 works; otherwise, a fourth determining module 609 works, specifically, the first determining module 603 in the present embodiment is configured to determine whether the first preset character string and the second preset character string are included in the current information record, if yes, the detaching module 604 works; otherwise, the fourth determining module 609 works; preferably, the first preset character string is mnt or storage, and the second preset character string is vfat;

a detaching module 604 which is configured to detach the current information record into a plurality of paths via a space;

a second pointing module 605 which is configured to make the first path as a current path of the current information record, and the second pointing module 605 is also configured to make a next path as the current path of the current information record;

a second determining module 606 which is configured to determine whether any preset character string is included in the current path, if yes, a recording module 607 works; otherwise, a third determining module 608 works, specifically, in Embodiment 3, the second determining module 606 is specifically configured to determine whether the first preset character string is included in the current path, if yes, the recording module 607 works; otherwise, a third determining module 608 works;

a recording module 607 which is configured to record the current path and make it as a suspected external SD card path;

a third determining module 608 which is configured to determine whether any unprocessed path is in the current information record, if yes, the second pointing module 605 works; otherwise, a fourth determining module 609 works;

a fourth determining module 609 which is configured to determine whether any unprocessed loading path exists in the loading paths list, if yes, the first pointing module 602 works; otherwise, a fifth determining module 610 works;

a fifth determining module 610 which is configured to determine whether any suspected external SD card path is recorded, if yes, a sixth determining module 611 works; otherwise, the final external SD card is not found;

a sixth determining module 611 which is configured to determine whether the final external SD card path is in the recorded suspected external SD card paths, if yes, the final external SD card is found; otherwise, the final external SD card is not found, specifically, the sixth determining module 611 is configured to use one suspected external SD card path for invoking an interface function to determine a result returned by the interface function if there are a plurality of suspected external SD card paths in Embodiment 3, the final external SD card is found if the result is the first preset value, the current suspected external SD card path is determined as the final external SD card path; the final external SD card is not found if the result is the second preset value.

Figure 7:
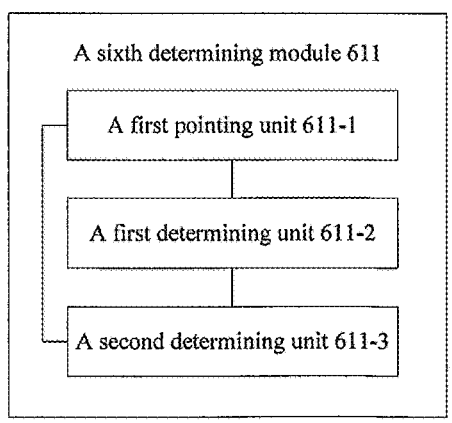
FIG. 7 shows a block diagram illustrating implementation of the sixth determining module in Embodiment 3.

As shown in FIG. 7, the sixth determining module 611 in the present embodiment includes: a first pointing unit 611-1 which is configured to make the recorded first suspected external SD card path as the current suspected external SD card, and to make the current suspected external SD card path as the current suspected external SD card path;

a determining unit 611-2 which is configured to determine whether the current suspected external SD card path is the final external SD card path, if yes, the final external SD card is found; otherwise, a second determining unit 611-3 works; and the second determining unit 611-3 which is configured to determine whether all of the suspected external SD card paths is processed, if yes, the final external SD card is not found; otherwise, the first pointing unit 611-1 works.

In Embodiment 3 of the present invention, all the suspected external SD card paths may be recorded by the device, and subsequently a device corresponding to one of the suspected external SD card paths is communicated with by the device, the final external SD card is found in the case that the device corresponding to one of the suspected external SD card paths is communicated with by the device successfully; the final external SD card is not found in the case that all of the suspected external SD card paths are communicated with unsuccessfully. The way of implementation includes: the obtaining module 601 obtains the loading paths list at first, the first pointing module 602 makes the first loading path in the loading paths list as the current information record, the first determining module 603 determines whether the current information record meets the filter criterion, the detaching module 604 detaches the current information record into a plurality of paths by the space if the result of the determining module 603 is the current information record meets the filter criterion; the second pointing module 605 makes the first path as the current path of the current information record, the second determining module 606 determines whether the current path includes the preset character string, the recording module 607 records the current path and make the current path as the suspected external SD card path if the second determining module 606 determines that the current path includes the preset character string; the third determining module 608 determines whether any unprocessed path in the current information record if the second determining module 606 determines that the current path does not include the preset character string, the second pointing module 605 makes the next path as the current path of the current information record in the case that the third determining module 608 determines that there exists unprocessed path in the current information record; the fourth determining module 609 determines whether the unprocessed loading path exists in the case that the third determining module 608 determines there exists no unprocessed path and the first determining module 603 determines that the current information record does not meet the filter criterion, the first pointing module 602 makes the next loading path of the loading paths list as the current information record in the case that the fourth determining module 609 determines that the unprocessed loading path exist; the fifth determining module 610 is configured to determine whether the suspected external SD card path is recorded in the case that the fourth determining module 609 determines no unprocessed loading path exits, the sixth determining module 611 determines whether the final external SD card path exists in the suspected external SD card path recorded in the case that the fifth determining module 610 determines that the suspected external SD card path is recorded, if yes, the final external SD card is found; while the final external SD card is not found in the case that the fifth determining module 610 determines that no suspected external SD card path exists and the sixth determining module 611 determines that the final external SD card path is not in the suspected external SD card path recorded.

Specifically, in Embodiment 3, the loading paths list may be obtained via the first obtaining unit 6011 in the obtaining module 601, subsequently, the first pointing module 602 works, the second obtaining unit 6012 in the obtaining module 601 obtains the loading paths list in the case that the fifth determining module 610 determines that no suspected external SD card path exists and the sixth determining module 611 determines that the final external SD card path does not exist, subsequently the first pointing module 602 works again. In the present Embodiment 3, if there exists no suspected external SD card path in all the loading paths obtained by the device via the mount command, all of the loading paths in Linux file system list are obtained, whether there exists the suspected external SD card path is determined, a device corresponding to the path is tried to be communicated with in the case that the suspected external SD card path is found, the SD card in the device corresponding to the path is the external SD card we found in the case that the device is communicated with successfully. With the method in Embodiment 3, the implementation of retrieving an external SD card under Android operation system will not rely on API function any more, and the device has a better compatibility.

In Embodiment 3, there exists another implementation of retrieving an external SD card by the device, that is, when one suspected external SD card path is found, it tries to communicate with the corresponding device, the final external SD card is found in the case that if the suspected external SD card path communicates with the device successfully; otherwise, the next suspected external SD card path is retrieving. Specifically, the implementation way includes: after the recording module 607 works, the sixth determining module 611 determines whether there exists the final external SD card path in the suspected external SD card path recorded, if yes, the final external SD card is found; otherwise, the third determining module 608 works; the fourth determining module 609 works when the third determining module 608 determines that there exists no unprocessed path in the current information records; the final external SD card is not found when the fourth determining module 609 determines that there exists no unprocessed loading path in the loading paths list.

While the preferred Embodiments of the present invention have been shown and described herein, it will be obvious for those skilled in the art that such Embodiments are provided by way of examples only. Any changes and substitutions will be covered by the scope of protection of the present invention. It is intended that the appended claims define the scope of protection of the present invention.

The invention claimed is:

1. A method for retrieving an external SD card, wherein the method comprises: Step S1, obtaining a loading paths list; Step S2, making a first loading path in the loading paths list as a current information record; Step S3, determining whether the current information record meets a filter criterion, if yes, executing Step S4; otherwise, executing Step S9; Step S4, detaching/splitting the current information record into a plurality of paths with a space, and making a first path as a current path of the current information record; Step S5, determining whether any preset character string is included in the current path, if yes, executing Step S6; otherwise, executing Step S7; Step S6, recording the current path and making it as a suspected external SD card path, then executing Step S7; Step S7, determining whether any unprocessed path exists in the current information record, if yes, executing Step S8; otherwise, executing Step S9; Step S8, making the next path as the current path of the current information record, then returning to Step S5; Step S9, determining whether any unprocessed loading path exists in the loading paths list, if yes, executing Step S10; otherwise, executing Step S11; Step S10, making the next loading path in the loading paths list as a current information record, then returning to Step S3; Step S11, determining whether any suspected external SD card is recorded, if yes, executing Step S12; otherwise, a final external SD card is not found; and Step S12, determining whether the final external SD card path exists in the recorded suspected external SD card paths, if yes, the final external SD card is found; otherwise, the final external SD card is not found.

2. The method of claim 1, wherein, Step S1 specifically comprises: obtaining all loading paths from a file system list via a mount command, and obtaining all loading paths in a Linux file system list, subsequently, obtaining the loading paths list in accordance with all of the obtained loading paths.

3. The method of claim 1, wherein,
Step S3 specifically comprises: determining whether a first preset character string and a second preset character string are included in the current information record, if yes, the current information record meets the filter criterion; otherwise, the current information record does not meet the filter criterion; and
Step S5 specifically including: determining whether the first preset character string is included in the current path, if yes, executing Step S6; otherwise, executing Step S7.

4. The method of claim 1, wherein, Step S12 specifically comprises:
Step S12-1, making the first recorded suspected external SD card path as a current suspected external SD card path;
Step S12-2, determining whether the current suspected external SD card path is the final external SD card path, if yes, finding the final external SD card; otherwise, executing Step S12-3; and Step S12-3, determining whether all suspected external SD card paths are processed, if yes, the final external SD card is not found; otherwise, making the next suspected external SD card path recorded as the current suspected external SD card path, and returning to Step S12-2.

5. The method of claim 1, wherein, Step S1 specifically comprises: obtaining the loading paths list by obtaining all loading paths from the file system list via the mount command;

when the final external SD card is not in the recorded suspected external SD card paths in Step 12, the method further includes:

Step S13, obtaining all loading paths in the Linux file system list;

Step S14, making the first obtained loading path as the current information record;

Step S15, determining whether the current information record meets the filter criterion, if yes, executing Step S16; otherwise, executing Step S21;

Step S16, detaching the current information record into a plurality of paths via the space, making the first paths as the current path of the current information record;

Step S17, determining whether the preset character string is included in the current path, if yes, executing Step S18; otherwise, executing Step S19;

Step S18, recording the current path and making the path as the suspected external SD card path, then executing Step S19;

Step S19, determining whether any unprocessed path exists in the current information record, if yes, executing Step S20; otherwise, executing Step S21;

Step S20, making the next path as the current path of the current information record, then returning to Step S17;

Step S21, determining whether any unprocessed loading path exists in the obtained loading paths, if yes, executing Step S22; otherwise, executing Step S21;

Step S22, making the next obtained loading path as the current information record, then returning to Step S15;

Step S23, determining whether any suspected external SD card path is recorded, if yes, executing Step S24; otherwise, the final external SD card is not found; and Step S24, determining whether the recorded suspected external SD card path has the final external SD card path, if yes, the final external SD card is found; otherwise, the final external SD card is not found.

* * * * *